United States Patent [19]
Lucas

[11] Patent Number: 5,452,137
[45] Date of Patent: Sep. 19, 1995

[54] EXTENDERS FOR REFLECTIVE OPTICAL PATH SEGMENTS

[75] Inventor: John R. Lucas, Glendale, Calif.

[73] Assignee: Litton Systems Inc., Woodland Hills, Calif.

[21] Appl. No.: 42,646

[22] Filed: Apr. 5, 1993

[51] Int. Cl.$^6$ .................... G02B 27/46; G06K 9/64
[52] U.S. Cl. ..................... 359/561; 359/559; 382/210; 382/278
[58] Field of Search .............. 359/29, 561, 894, 896, 359/503, 505, 555, 857, 856, 861, 559, 560, 431, 367; 382/10, 31, 42; 364/822; 372/94, 93, 70

[56] References Cited

U.S. PATENT DOCUMENTS

| | | | |
|---|---|---|---|
| 2,594,970 | 4/1952 | Monk | 359/861 |
| 3,469,922 | 9/1969 | Coccoli et al. | 372/94 |
| 3,578,846 | 5/1971 | Chen | 382/31 |
| 3,675,985 | 7/1972 | Gloge | 364/822 |
| 4,698,822 | 10/1987 | LePrince et al. | 372/70 |
| 4,709,989 | 12/1987 | Mächler | 359/896 |
| 4,796,270 | 1/1989 | Sheng et al. | 372/93 |
| 4,968,136 | 11/1990 | Lim et al. | 377/92 |
| 5,148,496 | 8/1992 | Anderson | 359/561 |

FOREIGN PATENT DOCUMENTS 0159401  12/1980  Japan .................. 359/857

*Primary Examiner*—Loha Ben
*Assistant Examiner*—John Juba, Jr
*Attorney, Agent, or Firm*—Donald J. Ellingsberg

[57] ABSTRACT

In an optical correlator system having reflective and transmissive optical components positioned along a folded and segmented optical axis or path, one or more optical path extenders are provided for selected optical path segments that require operative path length adjustment so that an electromagnetic radiation beam, which traverses the folded optical path with selected information imparted into and detected from the beam, can be imaged upon a defined and maximum usable area or region both on the reflective components and on an end detector component.

18 Claims, 2 Drawing Sheets

EXTENDERS FOR REFLECTIVE OPTICAL PATH SEGMENTS

CROSS-REFERENCE TO RELATED APPLICATION

The invention described and claimed herein can be related to U.S. patent application Ser. No. 07/996/584 which was filed Dec. 24, 1992 and assigned to the same assignee herein, and issued as U.S. Pat. No. 5,311,359.

BACKGROUND OF THE INVENTION

1. Field of the Invention

The invention is extenders for optical path segments particularly in an optical correlator system having reflective and transmissive optical components positioned along a folded optical axis or path.

2. Description of the related Art

The reflective optical correlator system as disclosed in the related application, supra, includes a planar support body having an irregular perimeter with a plurality of system stations formed at selected locations along the irregular perimeter of the support body. A plurality of reflective optical components are positioned at selected system stations. A coherent light beam traverses a folded optical axis or path tunneled within the planar body and bounded or defined by the reflective optical components.

The planar body of this extremely compact reflective optical correlator system is preferably formed from a ZERODUR TM material which maintains all of the optical components in a fixed and stable configuration with respect to each other over various hostile environments such as vibration and temperature variations. Coupled with its excellent mechanical rigidity, ZERODUR material also has excellent machining and polishing properties.

The folded optical path within the ZERODUR body has several sequential path segments. The length of a path segment can be the same as or be different from another path segment, and each can be accurately determined by the desired dimensions of the output correlator pattern traversing the optical path. The total length of the folded optical path (the sum of the lengths of the individual path segments) is determined by the required optical distances between the optical components.

But the fact that ZERODUR material has excellent mechanical rigidity and machining properties can have a disadvantage; an adverse production affect.

It is well known that production of an item or component for use in a system becomes cost effective when the item or component can be replicated as a standard item or component in production quantities rather than in the custom production of a single item or component in the very extreme situation.

Although the effect of reflective optical components on the light beam passing through the optical path segments can not be disregarded, it is the more noticeable effect of transmissive optical components that affect the quantity production of standardized planar blocks.

Transmissive optical components, virtually without exception, affect the light beam passing therethrough because of the index of refraction of the material that forms the component; typically a near optically pure transparent material such as clear glass. Regardless of the dimensional specifications for such transmissive optical components, any slight variation in a dimension such as thickness can affect the index of refraction. And this can affect the required length of a particular optical path segment associated with the optical component.

However, the standardized planar blocks in production quantity can not individually compensate for or correct these relatively slight variations in the index of refraction of any one transmissive optical component.

OBJECTS OF THE INVENTION

Accordingly, it is an object of the invention to compensate for unwanted differences between a desired length of an optical path segment and its necessary operative length.

It is an object of the invention to compensate for measurable differences between optical components where the differences affect the operative length of an optical path segment.

It is an object of the invention to compensate for non-standard transmissive optical components where each component may have a slightly different index of refraction that has a direct affect on the operative length of an optical path segment.

It is an object of the invention to provide means to readily compensate for non-standard components intended for use with a standard component in production quantities.

SUMMARY OF THE INVENTION

Briefly, in accordance with the invention, custom extenders compensate for each slight variation in the reflective or transmissive optical characteristics of optical components positioned along a folded optical path or axis where standard optical path segments that require path length adjustment can be adjusted by the selected extender in combination with a standard planar optical body.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawing(s).

BRIEF DESCRIPTION OF THE DRAWING(S)

FIG. 1 a perspective view of one optical correlator system with reflective optical components having sequential optical path segments and extenders as a preferred embodiment of the invention.

DESCRIPTION OF THE INVENTION

Figure 1:
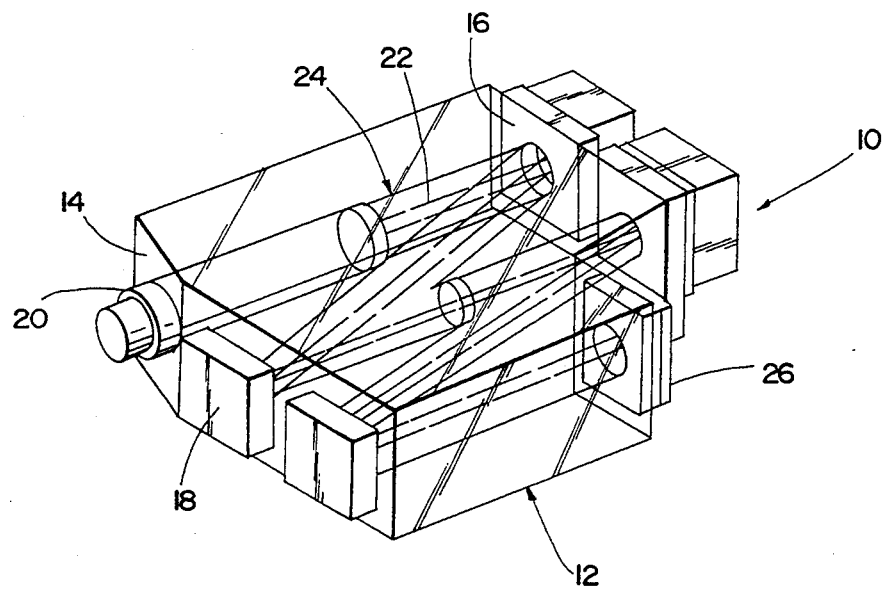

Referring to FIG. 1, a reflective optical correlator system 10 includes a planar support body 12 having an irregular perimeter 14 with a plurality of system stations 16 formed at selected locations along the irregular perimeter of the support body. Reflective optical components 18 are positioned at selected system stations. An electromagnetic radiation source 20 generates a coherent light beam 22 which traverses a folded tunnel that develops an optical axis or path 24 within the planar body 12, and that is bounded or further defined by the reflective optical components 18. The optical path 24 terminates at an array detector 26.

Figure 2:
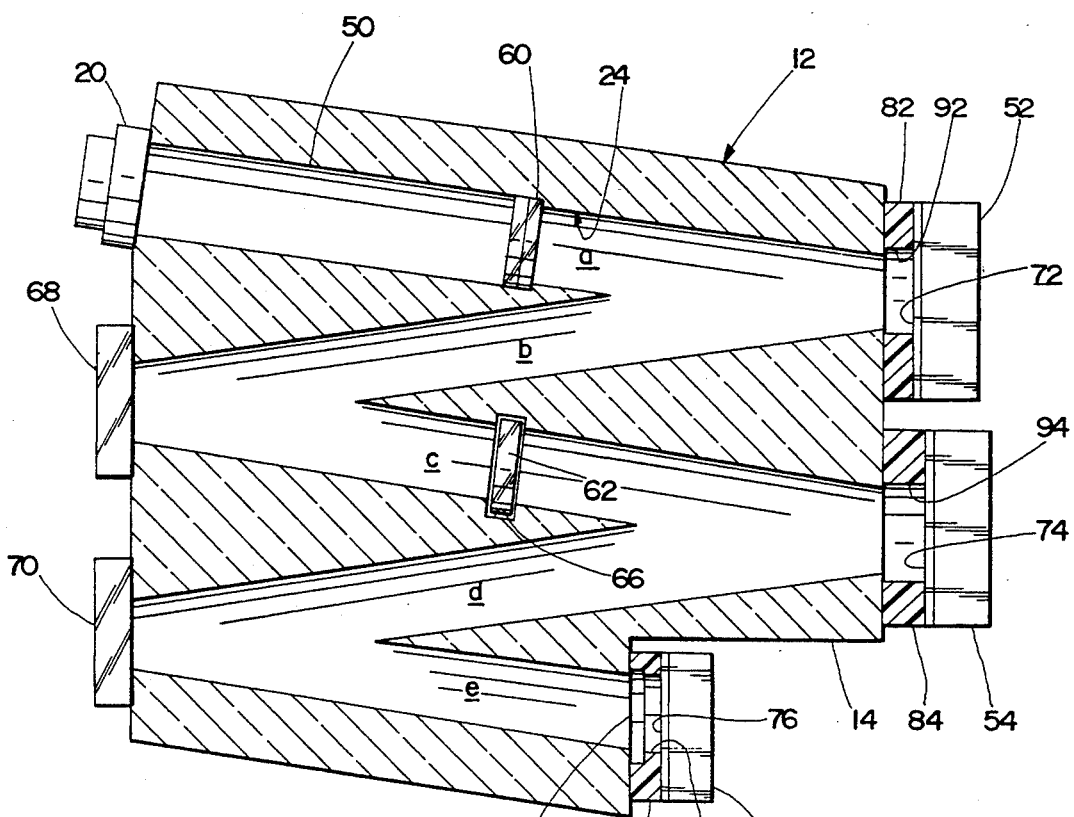
FIG. 2 is a plan view of a partial longitudinal cross section the planar support body for the optical correlator system of FIG. 1.

Referring now to FIGS. 1 and 2, the planar body 12 is preferably formed from a ZERODUR ™ material which maintains the optical components in a fixed and stable configuration with respect to each other over various hostile environments such as vibration and temperature variations. One such material is sold under the trademark ZERODUR ™ as is a glass ceramic with the lowest temperature expansion coefficient of any presently known material ($7 \times 10^{-8}$ per °Centigrade) which provides maximum positional stability of all components. Coupled with its excellent mechanical rigidity, ZERODUR material also has excellent machining and polishing properties.

As shown particularly by FIG. 2, the optical beam 22 passes along or through the tunnel 24 bored into and through the ZERODUR material in a sequential series of tunnel segments to provide a clear or material free path for the optical beam.

The tunnel 24, and thus the folded optical path, formed within the ZERODUR body 12 has several sequential tunnel or path segments 24a through 24e. As shown by FIG. 2, the length of a tunnel segment 24a through 24e can be different from another tunnel segment; for example, the length of segment 24e is less than the length of segment 24d. The asymmetry of the optical path and its total path length (the sum of the lengths of the individual segments) is determined by the required distances between the optical components. For the optical correlator system 10 of FIG. 1, these sequentially joined path segments of selected same or differing lengths develop the folded, asymmetrical optical path 24.

Figure 3:
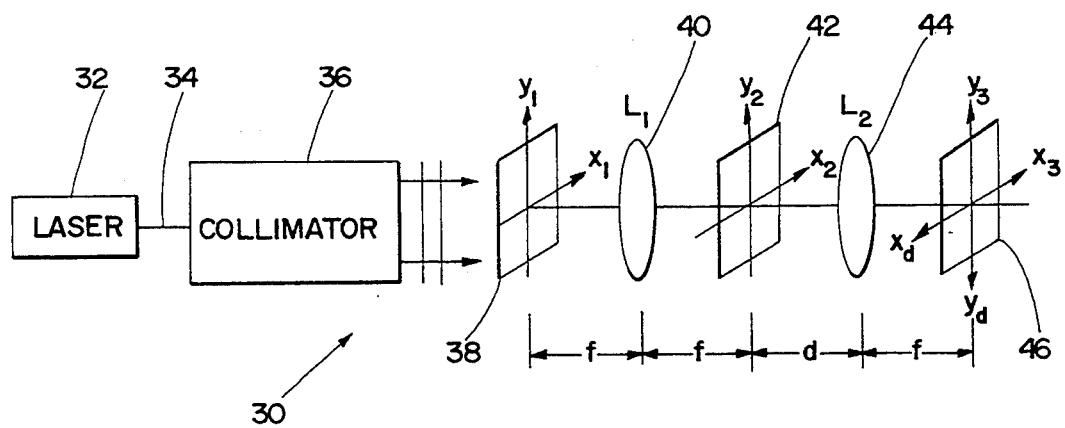
FIG. 3 is a schematic of a PRIOR ART VanderLugt linear optical correlator system.

The optical correlator system 10 of FIG. 1 with its folded optical path 24 should be considered in view of a PRIOR ART VanderLugt linear optical correlator system 30 as shown by FIG. 3.

The PRIOR ART linear optical correlator system 30 as shown by FIG. 3 has a laser 32 that develops a high intensity output beam 34 which is collimated through a collimator 36, and then expanded and focused by a suitable lens system onto an input spatial light modulator (SLM) 38. This input SLM 38 has a transmission function $f(x,y)$ which represents an object to be identified. Lens 40 images the Fourier transform of $f(x,y)$, $F(u,v)$ onto a filter SLM 42 in the Fourier plane. The filter SLM 42 has a transmission function $H(u,v)$, where $H(u,v)$ is the Fourier transform of some function $h(x,y)$. The optical field immediately downstream after the filter SLM 42 then is the product of $F(u,v)H(u,v)$. A second lens 44 images the Fourier transform of this product onto a detector 46, and auto-correlation produces a bright spot in its detector plane.

The distance d from the filter SLM chip 42 to lens 44 is not critical to the operation of the PRIOR ART linear optical correlator system 30 of FIG. 3 since it affects neither the correlation intensity pattern nor the imaging condition from the input plane at SLM chip 38 to the detector array plane surface of detector 46.

Figure 4:
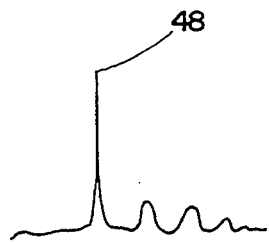
FIG. 4 is a graphical representation of an output waveform of an optical correlator system such as that of FIG. 1 and of FIG. 3.

Operatively, the PRIOR ART VanderLugt linear optical correlator system 30 detects and permits the identification of an object, through a transmission function $f(x,y)$ which is correlated against a set of filters $H_1(u,v) \ldots H_n(u,v)$. Each of these filters is written onto the filter plane SLM 42 sequentially, and the correlation for each is subsequently obtained. The filter produces an auto-correlation peak, such as peak 48 of FIG. 4, at the detector plane of detector 46 that indicates the location of the object and permits its identification.

Accordingly, the optical correlator system 10 as shown by FIG. 1 depends on the folding of a linear optical axis or path, like that of PRIOR ART linear optical correlator system 30 of FIG. 3, into a folded optical path such as tunnel of Path 24 as shown by FIGS. 1 and 2.

Referring now to FIG. 2, the electromagnetic radiation source 20 in one experimental optical correlator system is a conventional diode laser that generates a coherent visible beam having a 685 mm wavelength at an optical output power of 20 mW. The high intensity output beam is collimated and filtered by a unit 50 that includes a collimator portion (not shown) which is an assembly of several lenses and a Gaussian intensity filter. The collimator portion corrects for astigmatism and output beam ellipticity, and produces a round, collimated beam. In the experimental optical correlator system, the beam exits the unit 50 with an approximate 6 mm Gaussian diameter and illuminates an input SLM 52 by a plane wave with uniform intensity over 6 mm as developed by the Gaussian intensity filter.

The input SLM 52 is an electrically addressable magneto-optic chip that operates in a reflective mode. One such magneto-optic SLM is available as a MOSLM ™ chip from the Data Systems Division of Litton Systems, Inc., Agoura Hills, Calif. Currently, input SLM 52 is an available MOSLM chip having a $128 \times 128$ pixel array plane surface with pixel-to-pixel spacing of 24 microns (22 microns pixels with a 2 micron gap between pixels that are organized in rows and columns as the array surface; the resulting active area here then is a square measuring 3.1 mm on a side).

A filter SLM 54 is structurally identical to but functionally different from the input SLM 52.

Three polarizers 60, 62 and 64 are used in the optical path 22 of the optical correlator system 10 of FIG. 1. These polarizers are made of a dichroic film coated onto the surface of an optical flat. Each has a high extinction ratio (for example, 2000:1) and a high parallel transmission coefficient (for example, over 80 percent). Since each of the SLM chips 52 and 54 has an array of pixels which, in accordance with the Faraday effect, selectively rotate incoming linearly polarized light, then each SLM chip requires both an entrance polarizer and an exit polarizer which functions as an analyzer. Polarizer 60 is positioned in the optical path 22 between the collimator-filter unit 50 and the input SLM 52 to affect the exiting collimated and filtered beam exiting from the unit 50. The second polarizer 62 is selectively positioned in a slot 66 machined into the planar block 12 where as a reference or bench mark it intercepts the light beam traversing the optical path 22 as the information carrying beam is reflected from mirror 68. The polarizer 62 functions as the input SLM 52 exit analyzer, and correspondingly as the filter SLM 54 entrance polarizer. Polarizer 64, which intercepts the light beam as it is reflected from mirror 70, is juxtapositioned between the perimeter 14 of the planar block 12 and the array detector 26.

It is a fundamental of physics that a light beam passing through a transparent body will experience degradation; a lessening of light intensity. The same is true when the optical beam 22 passes through each of the polarizers 60, 62 and 64. Heretofore, however, it was considered necessary to position all the polarizers adjacent to an active or passive optical component. (An active optical component for purpose of description here can be the input SLM 52, the filter SLM 54, or the detector array 26; while passive optical components can be the reflective mirrors 68 and 70.) In the optical correlator system as disclosed in the related application, the second polarizer in the series of three polarizers is positioned adjacent a toric mirror which is equivalent to mirror 68 of FIG. 2. The polarizer so positioned intercepts the light beam passing from the input SLM to the mirror, and again as the reflected beam continues to the filter SLM. The result: the light beam is made to pass four times through three polarizers.

The planar body 12 of the present invention has the polarizer 62 positioned in tunnel segment 24c at a determinable and fixed optical station between the mirror 68 and the filter SLM 54. The result the light beam 22 is made to pass only once through each of the polarizers 60, 62 and 64 with a resulting decrease in light beam degradation of twenty-five percent (25%). Significant in the operation of an optical correlator system.

It is another fundamental of physics that light is refracted as it passes from one medium into another; the material of the medium has a known index of refraction. Here, the light beam 22 is refracted as it enters and also as it exits each of the polarizers 60, 62 and 64. Since the relative thickness of each polarizer can (and does) vary, this affects the refraction of the light beam by a polarizer differently for each.

As in all systems that are to be produced, it is always desirable to affect standard items and components for a system so that it can be easily manufactured and assembled with little or no requirement for custom-made parts. Where the planar block 12 is manufactured to standard dimensions and tolerances, it becomes necessary to compensate for the variations in the polarizers 60, 62 and 64 so that the information processed by the light beam 22 can be efficiently imaged upon each of the input SLM 52 and filter SLM 54 as well as the detector 26. Since the lengths of each of the tunnel segments 24a through 24e are also fixed during manufacture of the standard planar block 12, it becomes necessary to easily adjust these tunnel segment lengths to compensate for the refractive effect the polarizers have on the passing light beam.

Referring now to FIG. 2, polarizer 60 has a determinable index of refraction with a similarly determinable effect on the light beam 22 (see FIG. 1). The degree of divergence to the light beam exiting polarizer 60 can alter where the active array surface 72 of the input SLM 52 must be positioned relative to the polarizer. Determination of the linear dimension required from the polarizer 60 to the active surface 72 results in the maximum use of the active array surface for its intended purpose; for example, in an optical correlator system.

The standard length of tunnel segment 24a is known, and the required spacing of the active surface 72 of the input SLM 52 from polarizer 60 is determinable as a factor of its index of refraction and the cross-sectional area of the light beam 22 at this portion of the folded optical path. These values are used to calculate the required thickness $T_1$ of an extender 82 that is suitably bored to provide a tunnel segment extension 92, which exposes the array surface 72 of the input SLM 52.

Similarly, the standard length of tunnel segment 24c is known, and the required spacing of the active surface 74 of the filter SLM 54 from mirror 68 and polarizer 62 is determinable, and both are used to calculate the required thickness $T_2$ of an extender 84. A tunnel segment extension 94 is bored through extender 84 which exposes the array surface 74 of the filter SLM 54 when the extender 84 is positioned between the perimeter surface 14 of planar block 12 and the array surface 74 so that the tunnel segment extension 94 is appropriately aligned with tunnel segment 24c to expose the maximum array surface 74.

Again, the standard length of tunnel segment 24e is known between mirror 70 and polarizer 64. Polarizer 64 is preferably positioned on the perimeter 14 of planar block 12 to intercept the light beam 22 (see FIG. 1), as it traverses the folded optical path provided by the tunnel segments 24a through 24e, and affect the light beam as it passes through to be imaged on the detector array surface 76. This determinable affect of polarizer 64 on the light beam 22 is used to calculate the required thickness $T_3$ of an extender 86. A tunnel segment extension 96 is bored through extender 86 which, when the extender is positioned as shown by FIG. 2, exposes the detector array surface 76.

In one optical correlator system like the system 10 as shown by FIGS. 1 and 2, the planar body 12 was formed by machining a block of ZERODUR material to a thickness of 35.0 mm. The overall height of the planar body was 101.17 mm with a width of 84.9 mm. The irregular perimeter 14 has four machined and polished surfaces: the first to receive the electromagnetic radiation source 20, here a laser; surface two for the input SLM 52 and the filter SLM 54; surface three for the toric mirrors 68 and 70; and, surface four for the detector 26. Thus, from surface two to surface three, the height dimension is 101.17 mm while the lesser height dimension from surface three to surface four is 67.88 mm; both with ±0.05 mm tolerances. However, these tolerances may not be critical since it is possible to compensate for machining errors by an appropriate and calculated sizing of a particular extender thickness $T_1$, $T_2$ and $T_3$ such as one or more of the extenders 82, 84 and 86, respectively, which here were also formed of ZERODUR material.

In this planar body 12 of the optical correlator system 10, the diameter of each tunnel segment 24a through e was 10.0 mm. The bored receptacle for the collimator-filter unit 50 had an entrance diameter of 13.0 mm with a taper to 12.5 mm at the filter-polarizer 60. The overall length of the collimator-filter unit 50 was 55.8 mm. Polarizer 60, as well as polarizers 62 and 64, each had an average thickness of 3.25 mm.

The input SLM 52 and the filter SLM 54 were spaced apart on surface two of the planar block 12 a distance of 30.54 mm as measured on centers. The relative on centers dimension between the input SLM 52 and toric mirror 68 (measured in parallel along surfaces two and three) was 15.16 mm. While the similar measurement of on centers between the filter SLM 54 and the detector 26 was 26.7 mm.

The calculated thickness $T_1$ of extender 82 was 5.08 mm; $T_2$ of extender 84 was 6.70 mm (nominal); and, $T_3$ of extender 86 was 5.08 mm (nominal). The tunnel segment extension aperture in each extender had a diameter of 12.7 mm.

In the foregoing example of one optical correlator system, like the system 10 of FIGS. 1 and 2, the thickness $T_1$ of extender 82 is equal to thickness $T_3$ of extender 86, (that is, $T_1=T_3$); yet both $T_1$ and $T_3$ are dimensionally less than the thickness $T_2$ of extender 84. It is contemplated that in other optical correlator systems like the system 10 of FIGS. 1 and 2, each thickness $T_1$, or $T_2$, or $T_3$ of the respective extenders 82, or 84, or 86 can be either (1) dimensionally different from each another, for example, $T_1 \neq T_2 \neq T_3$; or (2) dimensionally different in part (as in the foregoing example where $T_1=T_3<T_2$); or (3) can be dimensionally equal, i.e., $T_1=T_2=T_3$.

Figure 5:
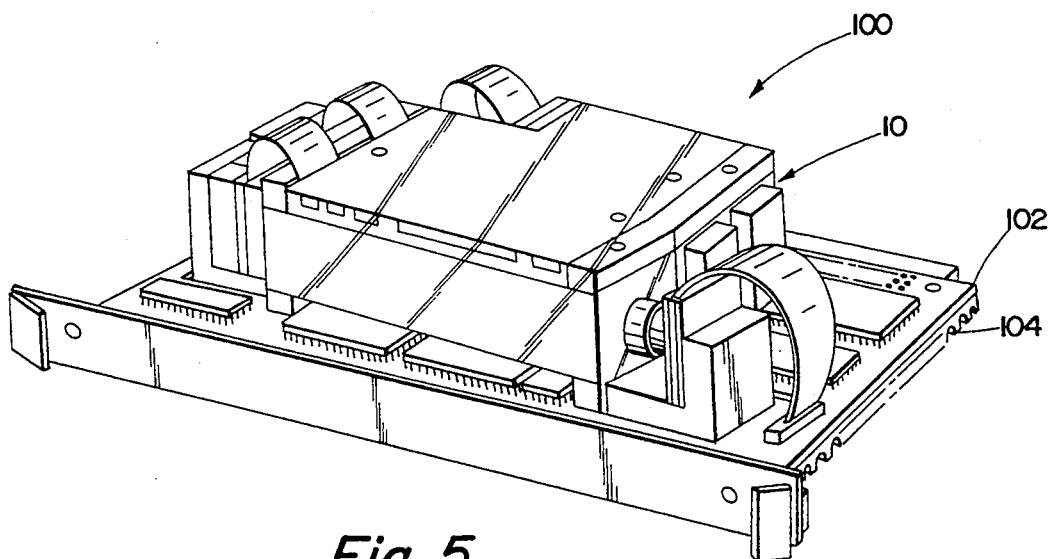
FIG. 5 is a perspective view of the optical correlator system, of FIG. 1 with the planar support body of FIG. 2, as a component for use in a selected optical system such as an electro-optical signal processor (not shown).

In FIG. 5, the optical correlator system 10 of FIGS. 1 and 2 forms a major component in an electro-optical signal processor card 100. The required support electronics and mechanical hardware are mounted and ultimately supported by the main card panel 102 with its complementary finned heat exchanger 104.

As will be evidenced from the foregoing description, certain aspects of the invention are not limited to the particular details of construction as illustrated, and it is contemplated that other modifications and applications will occur to these skilled in the art. It is, therefore, intended that the appended claims shall cover such modifications and applications that do not depart from the true spirit and scope of the invention.

I claim:

1. A reflective optical correlator system having a folded optical axis or path for the detection and identification of an unknown object where the object is represented at an input station of the system, imaged at a subsequent filter station in a Fourier transform plane, then detected and identified at a subsequent detector station CHARACTERIZED IN THAT the optical correlator system comprises:
   a) a planar optical correlator block having a perimeter;
   b) a plurality of optical path stations on said perimeter;
   c) respective ones of a plurality of tunnel segments formed in said correlator block and interconnected in series to define the folded optical path between associated ones of said optical path stations;
   d) selected respective ones of said optical path stations adapted to receive associated ones of reflective optical components, said associated ones of reflective optical components being selected from the group comprising
      1) an input spatial light modulator (SLM) array positioned at the input station,
      2) a filter SLM array positioned at the filter station, and
      3) first and second mirrors;
   e) a source of collimated and filtered coherent electromagnetic radiation positioned at an initial one of said optical path stations;
   f) a first transmissive optical polarizer positioned transverse to one of said tunnel segments adjacent said electromagnetic radiation source;
   g) a second transmissive optical polarizer positioned transverse to one of said tunnel segments between said input SLM array and said filter SLM array;
   h) a third transmissive optical polarizer positioned transverse to one of said tunnel segments and adjacent to the detector station;
   i) each of said polarizers having a determinable index of refraction that affects the electromagnetic radiation beam generated by said electromagnetic radiation source as said beam passes therethrough;
   j) a detector array positioned at the detector station; and
   k) at least one extender positioned between said detector station or a selected one of said reflective optical components and an associated one of said optical path stations, said extender including:
      1) a planar extender block having a selected thickness, and
      2) an aperture through said extender aligned with an associated one of said tunnel segments SO THAT said extender lengthens said associated one of said tunnel segments whereby said electromagnetic beam is imaged upon a defined and maximum usable area of each one of said input SLM, filter SLM, and detector arrays.

2. The reflective optical correlator system of claim 1 in which said electromagnetic radiation is light.

3. The folded reflective optical correlator system of claim 1 in which a polarizer slot is formed in said planar optical correlator block between said first mirror and said filter SLM array to receive said second transmissive optical polarizer.

4. The reflective optical correlator system of claim 3 where said slot is in juxtaposition with said first mirror and said filter SLM array.

5. The reflective optical correlator system of claim 3 in which one of said pair of mirrors is interposed in the optical path between said input SLM and said filter SLM.

6. The reflective optical correlator system of claim 1 in which said extender block has a thickness $T_1$.

7. The reflective optical correlator system of claim 1 comprising a pair of extenders wherein respective ones of said pair of extenders have associated thicknesses $T_1$ and $T_2$.

8. The reflective optical correlator system of claim 7 in which said associated thickness $T_1$ is equal to $T_2$.

9. The reflective optical correlator system of claim 7 in which said associated thickness $T_1$ is not equal to $T_2$.

10. The reflective optical correlator system of claim 1 comprising three extenders wherein respective ones of said three extenders have associated thicknesses of $T_1$, $T_2$, and $T_3$.

11. The reflective optical correlator system of claim 10 in which said associated thicknesses $T_1$, $T_2$ and $T_3$ are equal.

12. The reflective optical correlator system of claim 10 in which said associated thickness $T_1$ is equal to $T_2$.

13. The reflective optical correlator system of claim 10 in which said associated thickness $T_1$ is not equal to $T_2$.

14. The reflective optical correlator system of claim 10 in which said associated thickness $T_1$ is equal to $T_3$.

15. The reflective optical correlator system of claim 10 in which said associated thickness $T_1$ is not equal to $T_3$.

16. The reflective optical correlator system of claim 10 in which said associated thickness $T_2$ is equal to $T_3$.

17. The reflective optical correlator system of claim 10 in which said associated thickness $T_2$ is not equal to $T_3$.

18. A reflective optical correlator system for the detection and identification of an unknown object comprising:
   a) support means providing a folded optical axis or path, b) radiation source means to generate an electromagnetic beam to traverse said optical path,
c) reflective means associated with said support means to bound said beam along said path and selectively impart information into said beam,
d) transmissive means to selectively intercept said beam and affect its optical characteristics, said affect being measurable,
e) detector means to intercept said beam subsequent to said reflective and transmissive means effects for the detection and identification of the unknown object, and
f) extender means in juxtaposition with selected ones of said reflective and detector means to compensate for said measurable affect SO THAT said electromagnetic beam is imaged upon a defined and maximum usable area or region of said reflective and detector means.

* * * * *